United States Patent [19]

Hock et al.

[11] 4,167,519

[45] Sep. 11, 1979

[54] OLEIN-STEARIN SEPARATION

[75] Inventors: Ong S. Hock; Chuah C. Cheng, both of Minden, Malaysia

[73] Assignee: University of Science of Malaysia, Malaysia

[21] Appl. No.: 836,240

[22] Filed: Sep. 23, 1977

Related U.S. Application Data

[63] Continuation-in-part of Ser. No. 655,974, Feb. 6, 1976, abandoned.

[30] Foreign Application Priority Data

Mar. 7, 1975 [GB] United Kingdom .................. 9698/75

[51] Int. Cl.[2] ............................ C09F 5/10; C11B 3/00

[52] U.S. Cl. ................................. 260/428.5; 260/420; 426/417; 426/429

[58] Field of Search ...................... 260/428.5, 428, 420; 426/417, 429, 431

[56] References Cited

U.S. PATENT DOCUMENTS 2,320,738 6/1943 Jenkins ............................. 260/428.5

*Primary Examiner*—P. E. Konopka

*Attorney, Agent, or Firm*—Wenderoth, Lind & Ponack

[57] ABSTRACT

A process for separating olein and stearin fractions from an oil containing olein and stearin which process comprises providing a fluid comprising (a) the oil concerned, and (b) a liquid single phase mixture of two components;

(i) at least one liquid polyhydroxy compound or water, with (ii) at least one polar organic liquid, which liquid single phase mixture is substantially insoluble in the oil, and has a density intermediate those of the olein and stearin fractions, and separating the oil into olein and stearin fractions e.g. by either centrifuging the said fluid or allowing the said fluid to stand.

8 Claims, No Drawings

OLEIN-STEARIN SEPARATION

This is a continuation in part of our co-pending application U.S. Pat. No. 655,974, filed Feb. 6, 1976 now abandoned.

This invention relates to an improved process for separating the olein and stearin fractions of vegetable, animal and fish oils. Such oils include palm oil, rice bran oil, tallow, lard, herring oil, cotton seed oil and olive oil.

The olein fraction of an oil is liquid and generally contains a higher proportion of unsaturated components than the starting oil. The stearin fraction is generally solid and contains a lower proportion of unsaturated components.

Palm oil production is increasing all the time and now constitutes a significant proportion of the edible oils produced in the world. It has also been found that palm oil has an advantage over other oils in deep frying and at the moment there is a demand for the olein fraction. In the case of rice bran oil which can be extracted from rice it is likely to be an important source of edible oil as the world production of rice is likely to increase since it is the staple food of that part of the world whose population is increasing rapidly.

The various methods of olein-stearin separation are known:

(a) Winterisation
(b) Crystallisation with hexane
(c) Crystallisation with acetone
(d) Detergent process
(e) Crystallisation with isopropyl alcohol which contains a natural additive.

All these processes have certain disadvantages. In the first process, there is oil loss through occlusion, thus effecting the efficiency of separation. In those processes which use organic solvents, there is the danger of flammability and there arises the costly process of recovering the solvents. In the fourth process, there is a possibility of a health hazard and this process is still not acceptable in certain countries.

According to the present invention there is provided a process for recovering olein and stearin fractions from an oil containing olein and stearin fractions, which process comprises providing a fluid comprising:

(a) the oil, with
(b) a liquid single-phase mixture having a density intermediate those of the olein and stearin fractions to be separated and consisting, essentially of
(i) at least 30% by volume of water or at least 20% by volume of at least one aliphatic alcohol containing two or three hydroxyl groups per molecule and having a molecular weight below 1000,
(ii) not more than 80% by volume of at least one polar organic liquid selected from the group consisting of monohydric aliphatic alcohols, aliphatic aldehydes, and ketones having from 1 to 5 carbon atoms, at a temperature below the melting point of the stearin fraction to be separated and at which the liquid mixture is substantially insoluble in the oil, the proportion of oil to liquid mixture being from 10:1 to 1:10 by volume, separating the oil into olein and stearin fractions and recovering the fractions.

The liquid single phase mixture has a composition defined by the equation:

$$XD_1+(100-X)D_2=B$$

where X is the percentage of component (i), $D_1$ is the specific gravity of component (i) at 25° C., $D_2$ is the specific gravity of component (ii) at 25° C., and B depends on the specific gravity of the oil and varies between 87 and 97.

The olein and stearin thus separated can be recovered by standard techniques.

The temperature of the fluid is preferably from 0° to 35° C., e.g. from 3° C. to 25° C. Preferably the fluid is allowed to stand at ambient temperature.

When herring oil is used the separation may be carried out at a temperature lower than that used for other oils.

The preferred polyhydroxy compounds are selected from propylene glycol and glycerine, and the preferred organic liquids are selected from acetone, butanone, ethyl alcohol, n-propyl alcohol and isopropyl alcohol.

It has been found that when the oil/liquid mixture phase is subjected to centrifugation, two or three phases separate out, depending on the ratio of oil to liquid mixture, namely olein (top) and stearin/liquid mixture (bottom) or olein (top) liquid mixture (middle) and stearin/liquid (bottom), their relative positions being determined by their relative densities.

The solubility of the liquid mixture, particularly in the case of water and isopropyl alcohol mixture, in the olein fraction is low, e.g. less than 0.5%, for example about 0.26%, and the solubility of the oil, particularly in the case of palm oil, in the liquid mixture is less than 0.5%, for example about 0.25%.

The ranges of values for B have been calculated as follows:

| | B min. max. |
|---|---|
| Crude Palm Oil | 87–92 |
| Refined Palm Oil | 87–92 |
| Rice Bran Oil | 87–93 |
| Tallow | 87–96 |
| Lard | 87–97 |
| Herring Oil | 88–93 |
| Palm Kernel Oil | 89–95 |

The composition of the liquid mixture is determined within quite close limits by the need for it to be less dense than the stearin fraction but more dense than the olein fraction of the oil. The optimum value of B in the equation given above varies somewhat in different systems and with different oils as indicated above. For example in the case of a liquid mixture of water and isopropyl alcohol with palm oil, the preferred range of B extends from 87 to 91 and the optimum figure is 89. The relative volumes of liquid mixture to oil may vary from 10:1 to 1:10 particularly 10:1 to 1:5 where separation is effected by allowing the fluid to stand. It has been found that the best separation, when using centrifugation, is obtained by using a volume ratio of oil to liquid mixture of 1:1 although good separation can be obtained by using ratios of oil to liquid mixture 3:2, 7:3 and 4:1. Where the fluid is allowed to stand the best separation is obtained by using a volume ratio of oil to liquid mixture of 1:3 although good separation can be obtained using a ratio of oil to liquid mixture of 1:1. As the proportion of the liquid mixture in the fluid decreases, the time required for complete separation increases considerably.

Good separation can be achieved using centrifugation at as low as 900 g although centrifugation at 2000 g or more is preferred in the case of palm oil using water and isopropyl alcohol mixture. The best condition for lard and tallow is 2500 g.

In fact with a continuous process it has been found most practical to use a centrifugation of 5800 g (8000 rpm) and a gravity disc of 53 mm with a continuous separator.

The ratio of oil to liquid mixture seems to affect both the yield of olein and the number of phases resulting from the separation. Although fractionation can be achieved in the separator without the use of a liquid mixture, the yield was found to be low. However, using a ratio of palm oil to liquid mixture of 1.6:1, the yield is approximately 70% representing over 90% of the available oil. Three phases result from this condition in which one contains the olein phase, and the others the liquid mixture phase and the stearin phase. On increasing the ratio of palm oil to liquid mixture to 4:1 the best yield is provided and under this condition only two layers result.

In the continuous separator referred to, there are three exits and under the condition of low ratio of palm oil to solvents e.g. 1.6:1, olein, liquid mixture and stearin with some liquid mixture come off through the three different exits. However, under a higher ratio of palm oil to liquid mixture e.g. 4:1, olein comes off one exit, stearin with some liquid mixture through another exit but no liquid mixture leaves the third exit. There is no question of the liquid mixture dissolving in the oil. It was also found that careful crystallisation of the palm oil from 52° to 22° C. with $\Delta t=2°$ C. (where $\Delta t$=temperature difference of the palm oil and cooling bath) and making use of the ratio 4:1, one obtains about 70% yield of olein having better properties. The properties of the fractions resulting from this method of fractionation of crude palm oil were found to be as follows:

| | Iodine Value | Free Fatty Acid | β-Carotene | Tocopherols | Cloud Point | Melting Point |
|---|---|---|---|---|---|---|
| Olein | 60 | 2.2 | 744 p.p.m. | 999 | 9.5° C. | |
| Stearin | 47 | 1.7 | 498 p.p.m. | 630 | | 51.0°-53.0° C. |
| Crude Palm Oil | 54 | 2.3 | 698 p.p.m. | 946 | | |

| | Acid % | Acid % | Acid % | Acid % | Acid % | Lino-Acid % | Arachi-Acid % | Lino-Acid % |
|---|---|---|---|---|---|---|---|---|
| Olein | 0.10 | 1.0 | 39 | 43 | 4.5 | 12 | 0.35 | 0.41 |
| Stearin | 0.06 | 1.4 | 52 | 34 | 4.1 | 9.0 | 0.40 | 0.31 |
| Crude Palm Oil | 0.05 | 1.0 | 44 | 40 | 4.1 | 10 | 0.30 | 0.20 |

The liquid mixtures from the continuous separations were collected and studied. They were first found to have dissolved some nonglyceride components. These have been identified as phosphatides particularly lecithin, sterols, some free fatty acids and tocopherols. The recovered liquid mixtures can be used again after distillation and it has been estimated by NMR analysis that they consist of about 17% water which can be reconstituted for use again as a component for the liquid mixture. Another way of recovering the liquid mixture is to dilute it with water resulting in the precipitation of the nonglyceride components which can then be filtered using a bed of activated carbon or Fuller's earth. The filtrate could be used again by adding the appropriate volume of component (ii).

The process may be performed in a continuous manner by mixing the oil and the liquid single phase mixture in a column, allowing the fluid to stand and withdrawing the olein from the top of the column and the stearin from the bottom of the column. The column containing the remaining liquid mixture is continuously or intermittently replenished with oil and the process continued. In this way there is saving in the use of the liquid single phase mixture.

The process of the present invention has several applications:

(1) It can be used as an industrial separation of olein and stearin formed under different cooling conditions for vegetable, animal and fish oils.

(2) Besides concentrating the β-carotene of the oil, it can be used to selectively extract nonglyceride components particularly tocopherols, phosphatides and sterols.

(3) Since the method is simple and fast, it can be adopted as an analytical method for the estimation of the olein-stearin ratio of oils particularly palm oil. Since an ordinary centrifuge is required for this analytical work, this process could be easily adopted as an analytical method.

The following Tables I to VI show the conditions under which separation of olein and stearin fractions from oils was achieved using the process according to the invention.

| Liquid Single Phase Mixtures | A Crude Palm Oil | B Refined Palm Oil | C Rice Bran Oil* | D Tallow | E Lard | F Herring Oil |
|---|---|---|---|---|---|---|
| 1. Water:Acetone | 36:65 (v/v) | 36:64 (v/v) | 34:66 (v/v) | 35:65 | 38:62 (v/v) | 35:65 (v/v) (v/v) |
| 2. Water:Ethyl alcohol | 43:57 | 43:57 | 42:58 | 45:54 | 44:56 | 41:59 |
| 3. Water:Propyl alcohol | 44:56 | 44:56 | 44:56 | 47:53 | 46:54 | 46:54 |
| 4. Water:Isopropyl alcohol | 45:55 | 44:56 | 46:54 | 45:55 | 45:55 | 47:53 |
| 5. Propylene Glycol:Acetone | 36:64 | 38:62 | 38:62 | 33:67 | 35:65 | 34.5:65.5 |
| 6. Propylene Glycol:Butanone | 28:72 | 29:71 | — | — | 32:68 | — |
| 7. Propylene Glycol:Ethyl alcohol | 47:53 | 47:53 | 46:54 | 48:52 | 48:52 | 44.5:55.5 |
| 8. propylene Glycol:n-Propyl alcohol | 44:56 | 45:55 | 47:53 | 46:54 | 45:55 | 45:55 |

-continued

| | | | | | | |
|---|---|---|---|---|---|---|
| 9. Propylene Glycol:Isopropyl alcohol | 48:52 | 47:53 | 50:50 | 48:52 | 48:52 | 50:50 |
| 10. Glycerine:Ethyl alcohol | 24:76 | 25:75 | 23:77 | 25:75 | 25:75 | 21:79 |
| 11. Glycerine:n-Propyl alcohol | 22:76 | 24:76 | 22:78 | 21:79 | 22:78 | 25:75 |
| 12. Glycerine:Isopropyl alcohol | 23:77 | 25:75 | 25:75 | 22:78 | 24:76 | 23:77 |

Centrifugation Conditions

A. 2000 g for 5 minutes at 25° C.
B. 2500 g for 5 minutes at 25° C.
C. 2500 g for 5 minutes at 25° C.
D. 2500 g for 15 minutes at 25° C.
E. 2500 g for 5 minutes at 25° C.
F. 2000 g for 5 minutes at 3° C.

The volume ratio of oil to solvent system in each case is 1:1.
*The separation involves the oil and the wax.

TABLE II

Conditions for Effecting Olein-Stearin Separation of Palm Oil by Gravity[1]

| Liquid Single Phase Mixture | Time for Complete Separation: Refined Palm Oil | Time for Complete Separation: Crude Palm Oil |
|---|---|---|
| 13. Propylene Glycol:Butanone (30:70 v/v) | 5 mins. | 15 mins. |
| 14. Propylene Glycol:Acetone (37:63 v/v) | 10 mins. | 30 mins. |
| 15. Water:Acetone (33:67 v/v) | 15 mins. | — |
| 16. Glycerine:Isopropyl alcohol (23:77 v/v) | 4 hrs. | — |
| 17. Glycerine:n-Propyl alcohol (22:78 v/v) | 48 hrs. | — |
| 18. Water:Isopropyl alcohol (45:55 v/v) | 48 hrs. | 72 hrs. |

[1]Volume ratio of palm oil to liquid single phase mixture is 1:3.

TABLE III

Conditions for Effecting Olein-Stearin Separation of Palm Kernel Oil by Centrifugation

| Liquid Single Phase Mixture | Ratio (v/v) | Centrifugation Conditions |
|---|---|---|
| 19. Water:Isopropyl alcohol | 48:52 | |
| 20. Water:Propyl alcohol | 50:50 | ca.14,900g for 15 mins. Temp.: 25° C. |
| 21. Propylene Glycol:Propyl alcohol | 46:54 | |
| 22. Glycerine:Ethyl alcohol | 24:76 | |
| 23. Glycerine:Propyl alcohol | 26:74 | |

TABLE IV

Fractionation of Crude Palm Oil by Alfa-Laval Separator LAPX 202

| Oil:Solvent | Sample | % Olein by Alfa-Laval Separator | Olein Content (%) | % Yield based on available olein | M.Pt. (°C.) | Cloud Pt. (°C.) | FFA | Carotene Content (ppm) | Tocopherol Content (ppm) | Iodine Value | Unsat. Acids (%) | Sat. Acids (%) |
|---|---|---|---|---|---|---|---|---|---|---|---|---|
| No Solvent | oil | — | — | | — | — | 2.32 | 698 | 646 | 54.1 | 50.6 | 49.4 |
| | olein | 55.0 | 72.2 | 76.2 | 16.0–17.0 | 10.5 | 2.22 | 709 | 778 | 60.2 | 54.3 | 45.7 |
| | stearin | — | — | | 45.8–46.8 | | 1.81 | 522 | 413 | 50.6 | 44.6 | 55.2 |
| 1:1 | oil | — | — | | — | — | 2.53 | 632 | 693 | 54.3 | 50.0 | 50.0 |
| | olein | 72.5 | 80.0 | 90.6 | 15.5–16.3 | 11.8 | 2.83 | 681 | 790 | 59.2 | 53.6 | 46.3 |
| | stearin | — | — | | 52.0–53.0 | | 2.76 | 378 | 495 | 45.0 | 41.7 | 58.9 |
| 1.6:1 | oil | — | — | | — | — | 2.01 | 734 | 857 | 55.3 | 51.4 | 48.6 |
| | olein | 57.2 | 71.7 | 79.8 | 21.6–24.6 | 11.3 | 2.13 | 755 | 910 | 60.0 | 55.0 | 45.1 |
| | stearin | — | — | | 49.5–51.0 | | 1.70 | 565 | 632 | 47.9 | 45.0 | 55.1 |
| 2:1 | oil | — | — | | — | — | 2.04 | 635 | 547 | 54.5 | 49.6 | 50.4 |
| | olein | 73.1 | 81.7 | 89.5 | 18.0–20.0 | 11.8 | 2.28 | 699 | 710 | 57.1 | 52.8 | 47.2 |
| | stearin | — | — | | 54.0–54.5 | — | 1.58 | 386 | 384 | 43.9 | 40.5 | 59.6 |
| 3:1 | oil | — | — | | — | — | 2.50 | 632 | 568 | 54.9 | 50.0 | 50.0 |
| | olein | 62.5 | 73.3 | 85.2 | 19.0–21.5 | 11.2 | 2.28 | 702 | 685 | 59.1 | 54.3 | 46.0 |
| | stearin | — | — | | 51.0–52.0 | — | 1.73 | 464 | 350 | 45.6 | 42.5 | 57.3 |
| 4:1 | oil | — | — | | — | — | 2.32 | 698 | 567 | 54.1 | 50.6 | 49.4 |
| | olein | 66.3 | 72.2 | 91.8 | 16.3–17.0 | 10.6 | 2.27 | 760 | 721 | 59.6 | 54.2 | 45.9 |
| | stearin | — | — | | 51.5–52.5 | — | 1.77 | 502 | 352 | 46.2 | 42.0 | 58.0 |
| 5:1 | oil | — | — | | — | — | 2.32 | 698 | 670 | 54.1 | 50.6 | 49.4 |
| | olein | 55.0 | 72.2 | 76.2 | 16.5–17.0 | 11.0 | 2.26 | 734 | 801 | 60.6 | 54.6 | 45.4 |
| | stearin | — | — | | 46.0–47.3 | — | 1.83 | 540 | 433 | 49.7 | 46.4 | 54.6 |

Solvent system: 45% water and 55% isopropanol
Unsat. = Unsaturated
Temperature: about 29° C.
Sat. = Saturated
Speed: 8200 r.p.m.

TABLE V

Fractionation of Recrystallised Crude Palm Oil by Alfa-Laval Separator LAPX202

| 0:1:Solvent Ratio | Sample | % Olein by Alfa-Laval Separator | Olein Content (%) | % Yield based on available olein | M.Pt. (°C.) | Cloud Pt. (°C.) | FFA | Carotene Content (ppm) | Tocopherol Content (ppm) | Iodine Value | Unsat. Acids (%) | Sat. Acids (%) |
|---|---|---|---|---|---|---|---|---|---|---|---|---|
| 1:1 | oil | — | — | — | — | — | 2.00 | 625 | 632 | 53.7 | 49.9 | 50.0 |
| | olein | 56.3 | 63.3 | 88.8 | 17.2–18.5 | 11.3 | 2.20 | 652 | 682 | 57.2 | 54.3 | 45.9 |
| | stearin | — | — | — | 51.3–52.3 | — | 1.65 | 433 | 350 | 46.3 | 42.6 | 57.4 |
| 1.6:1 | oil | — | — | — | — | — | 2.27 | 669 | 560 | 53.4 | 49.9 | 50.0 |
| | olein | 62.5 | 65.0 | 96.2 | 16.0–17.0 | 10.5 | 2.74 | 684 | 685 | 58.7 | 54.4 | 46.0 |
| | stearin | — | — | — | 51.0–52.5 | — | 2.16 | 415 | 334 | 46.1 | 42.7 | 57.2 |

TABLE V-continued

| Fractionation of Recrystallised Crude Palm Oil by Alfa-Laval Separator LAPX202 | | | | | | | | | | | | |
|---|---|---|---|---|---|---|---|---|---|---|---|---|
| 0:1:Solvent Ratio | Sample | % Olein by Alfa-Laval Separator | Olein Content (%) | % Yield based on available olein | M.Pt. (°C.) | Cloud Pt. (°C.) | FFA | Carotene Content (ppm) | Tocopherol Content (ppm) | Iodine Value | Unsat. Acids (%) | Sat. Acids (%) |
| 2:1 | oil | — | — | — | — | — | 2.06 | 665 | 584 | 55.1 | 49.7 | 50.3 |
| | olein | 65.6 | 66.7 | 96.4 | 16.0–18.0 | 11.4 | 2.23 | 651 | 710 | 57.0 | 53.9 | 46.6 |
| | stearin | — | — | — | 51.0–51.5 | — | 1.86 | 395 | 358 | 45.1 | 42.1 | 57.9 |
| 3:1 | oil | — | — | — | — | — | 2.10 | 651 | 600 | 53.5 | 50.0 | 50.0 |
| | olein | 71.3 | 70.0 | Quant | 18.0–20.0 | 11.5 | 2.34 | 725 | 723 | 58.5 | 54.2 | 45.9 |
| | stearin | — | — | — | 52.3–53.5 | — | 1.62 | 431 | 376 | 43.0 | 39.1 | 61.2 |
| 4:1 | oil | — | — | — | — | — | 2.32 | 698 | 946 | 54.1 | 50.6 | 49.4 |
| | olein | 68.8 | 72.2 | 95.3 | 24.0–25.0 | 9.5 | 2.20 | 744 | 999 | 60.0 | 54.8 | 45.2 |
| | stearin | — | — | — | 51.0–53.0 | — | 1.74 | 498 | 630 | 47.2 | 43.5 | 58.1 |
| 5:1 | oil | — | — | — | — | — | 1.98 | 666 | 663 | 53.7 | 50.0 | 50.2 |
| | olein | 60.6 | 60.0 | Quant | 17.0–17.6 | 10.5 | 2.21 | 722 | 717 | 58.0 | 53.9 | 45.2 |
| | stearin | — | — | — | 48.0–51.5 | — | 1.75 | 503 | 262 | 47.3 | 42.8 | 56.9 |

Solvent system: 45% water and 55% isopropanol
Temperature: 20° C.
Speed: 8200 r.p.m.
Quant. = Quantitative
Unsat. = Unsaturated
Sat. = Saturated

TABLE VI

| Fractionation of Recrystallised Palm Oil at Low Temperatures by Centrifugation | | | | | |
|---|---|---|---|---|---|
| Sample | Fractionated at | % Yield of olein | M.Pt. of olein (°C.) | Cloud Pt. of olein (°C.) | M.Pt. of stearin (°C.) |
| Crude palm oil | 20° C. | 70.0 | 20.0–21.5 | 6.8 | 52.0–52.5 |
| Crude palm oil | 18° C. | 60.0 | 19.0–20.0 | 6.0 | 51.5–52.0 |
| Crude palm oil | 16° C. | 48.0 | 19.0–20.0 | 5.5 | 50.0–51.0 |
| SPB oil | 20° C. | 72.0 | 20.0–21.0 | 6.5 | 51.0–52.0 |
| SPB oil | 18° C. | 60.0 | 19.0–20.0 | 5.0 | 49.0–60.0 |
| SPB oil | 16° C. | 45.0 | 19.0–20.0 | 4.8 | 45.0–47.0 |
| Olein | 10° C. | 17.3 | 18.5–19.5 | 4.0 | 25.0–26.5 |

Solvent system: 45% water and 55% isopropanol
g. value: 14900 g
Time: 30 minutes

What is claimed is:

1. A process for recovering olein and stearin fractions from an oil containing olein and stearin fractions, which process comprises providing a fluid comprising:
   (a) the oil, with
   (b) a liquid single-phase mixture having a density intermediate those of the olein and stearin fractions to be separated and consisting, essentially of
      (i) at least 30% by volume of water or at least 20% by volume of at least one aliphatic alcohol containing two or three hydroxyl groups per molecule and having a molecular weight below 1000,
      (ii) not more than 80% by volume of at least one polar organic liquid selected from the group consisting of monohydric alihphatic alcohols, aliphatic aldehydes, and ketones having from 1 to 5 carbon atoms, at a temperature below the melting point of the stearin fraction to be separated and at which the liquid mixture is substantially insoluble in the oil, the proportion of oil to liquid mixture being from 10:1 to 1:10 by volume, separating the oil into olein and stearin fractions by physical separation into layers and recovering the fractions.

2. A process as claimed in claim 1 wherein the temperature of the fluid is from 0° to 35° C.

3. A process as claimed in claim 1, wherein the oil is a palm oil which has been refined by partial crystallisation.

4. A process as claimed in claim 1 wherein separation of the fractions is effected by allowing the fluid to stand at ambient temperature.

5. A process as claimed in claim 1 wherein the case where separation is effected by allowing the fluid to stand the volume ratio of liquid mixture to oil varies from 10:1 to 1:5.

6. A process as claimed in claim 1 wherein separation of the fractions is effected by centrifuging at at least 900 g.

7. A process as claimed in claim 1 wherein the polyhydroxy compound is selected from propylene glycol and glycerine.

8. A process as claimed in claim 1 wherein the polar organic liquid is selected from acetone, butanone, ethyl alcohol, n-propyl alcohol and isopropyl alcohol.

* * * * *

UNITED STATES PATENT OFFICE
CERTIFICATE OF CORRECTION

Patent No. 4,167,519 Dated September 11, 1979

Inventor(s) Soon Hock Ong and Chong Cheng Chuah

It is certified that error appears in the above-identified patent and that said Letters Patent are hereby corrected as shown below:

Please correct the inventors' names appearing in item [75] as follows:

Change "Ong S. Hock" to -- Soon H. Ong --. and change "Chuah C. Cheng" to -- Chong C. Chuah --.

Signed and Sealed this

*Twenty-seventh* Day of *November 1979*

[SEAL]

*Attest:*

LUTRELLE F. PARKER
*Acting Commissioner of Patents and Trademarks*

RUTH C. MASON
*Attesting Officer*